US012750316B2

(12) United States Patent
Drake et al.

(10) Patent No.: US 12,750,316 B2
(45) Date of Patent: *Sep. 29, 2026

(54) SYSTEMS AND METHODS FOR ENHANCED AUTONEGOTIATION

(71) Applicant: Level 3 Communications, LLC, Denver, CO (US)

(72) Inventors: Steven E. Drake, Thornton, CO (US); Charles R. Lyman, Longmont, CO (US)

(73) Assignee: Level 3 Communications, LLC, Denver, CO (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/666,402

(22) Filed: May 16, 2024

(65) Prior Publication Data

US 2024/0305570 A1 Sep. 12, 2024

Related U.S. Application Data

(63) Continuation of application No. 17/968,843, filed on Oct. 19, 2022, now Pat. No. 11,991,083, which is a continuation of application No. 17/509,637, filed on Oct. 25, 2021, now Pat. No. 11,736,403, which is a continuation of application No. 16/815,956, filed on Mar. 11, 2020, now Pat. No. 11,165,708, which is a (Continued)

(51) Int. Cl.

| | |
|---|---|
| ***H04L 47/21*** | (2022.01) |
| ***H04J 3/16*** | (2006.01) |
| ***H04L 47/2425*** | (2022.01) |
| ***H04L 47/263*** | (2022.01) |
| ***H04L 67/141*** | (2022.01) |
| ***H04L 69/24*** | (2022.01) |

(52) U.S. Cl.

CPC ............ *H04L 47/21* (2013.01); *H04J 3/1617* (2013.01); *H04L 47/2425* (2013.01); *H04L 47/263* (2013.01); *H04L 67/141* (2013.01); *H04L 69/24* (2013.01); *H04J 2203/0067* (2013.01); *H04J 2203/0085* (2013.01)

(58) Field of Classification Search

CPC ... H04L 47/21; H04L 47/2425; H04L 47/263; H04L 67/141; H04L 69/24; H04J 3/1617; H04J 2203/0067; H04J 2203/0085; Y02D 30/50

USPC .......................................................... 370/235

See application file for complete search history.

(56) References Cited

U.S. PATENT DOCUMENTS 5,528,591 A * 6/1996 Lauer .................. H04L 12/5602 370/231

6,269,085 B1 * 7/2001 Provino .............. H04L 12/1877 370/408

(Continued)

*Primary Examiner* — Mang Hang Yeung

(57) ABSTRACT

An improved autonegotiation approach includes determining that a negotiated rate between a first network device and a second network device exceeds data transfer capacity over a network path downstream of the second network device. In response, a configuration message is generated and transmitted to the first network device. When received by the first network device, the configuration message causes the first network device to limit data transfer between the first network device and the second network device to no more than the downstream data transfer capacity.

14 Claims, 4 Drawing Sheets

Related U.S. Application Data continuation of application No. 16/036,677, filed on Jul. 16, 2018, now Pat. No. 10,594,613.

(60) Provisional application No. 62/533,924, filed on Jul. 18, 2017.

(56) References Cited

U.S. PATENT DOCUMENTS

| | | | | |
|---|---|---|---|---|
| 6,970,424 | B2 * | 11/2005 | Fawaz | H04L 47/32 370/232 |
| 2005/0066035 | A1 * | 3/2005 | Williams | H04L 12/4641 709/245 |
| 2009/0245112 | A1 * | 10/2009 | Okazaki | H04L 47/263 370/235 |
| 2010/0103816 | A1 * | 4/2010 | Eiro | H04L 47/12 370/230 |
| 2015/0271865 | A1 * | 9/2015 | Carson | H04L 45/245 370/329 |
| 2019/0028392 | A1 | 1/2019 | Drake et al. | |
| 2020/0213234 | A1 | 7/2020 | Drake | |
| 2022/0045957 | A1 | 2/2022 | Drake | |
| 2023/0037903 | A1 | 2/2023 | Drake | |

* cited by examiner

SYSTEMS AND METHODS FOR ENHANCED AUTONEGOTIATION

TECHNICAL FIELD

Aspects of the present disclosure involve negotiating transmission parameters for transmitting data between network devices. More specifically, aspects of the present disclosure involve dynamic modification of data transfer rate limits between network devices to account for potential bottlenecks and other transfer rate reductions along paths extending from the network devices.

BACKGROUND

Autonegotiation generally refers to the process by which two networked devices determine a set of parameters by which data is to be exchanged between the devices. Such parameters may include, without limitation, one or more rates of transmission, a duplex mode, and/or flow control mechanisms. During autonegotiation, the connected devices share their capabilities regarding the transmission parameters and then choose the highest performance transmission mode supported by both devices.

Although the autonegotiation process may select transmission parameters that are supported by two devices, the same parameters may be incompatible with networks to which the devices are coupled. For example, one of the network devices may be a transceiver adapted to convert network traffic from a first network protocol to a second network protocol, the second network protocol having transmission parameters, such as bandwidth, that are incompatible or that do not match with those of the first network. The resulting mismatch may result in lost data and/or inefficient network performance.

It is with these observations in mind, among others, that aspects of the present disclosure were conceived.

SUMMARY

In one implementation of the present disclosure, a method for establishing a data transfer rate between network endpoints is provided. The method includes initiating a connection between a first endpoint of a first network and a second endpoint of a second network, the connection between the endpoint of the first network and the endpoint of the second network supporting data transfer at up to a first transfer rate. The method next includes determining the first transfer rate is greater than a second transfer rate for transferring data over the second network. In response to doing so, a configuration message is transmitted to a network device corresponding to the first endpoint. The configuration message causes the network device to limit transfer of data over the connection from the first endpoint to the second endpoint to no greater than the second transfer rate.

In another implementation of the present disclosure, a system for controlling data transfer rates between network devices is provided. The system includes a computing device comprising a processor and one or more non-transitory tangible computer-readable storage media storing computer-executable instructions. When executed by the processor, the instructions cause the computing device to determine that a negotiated transfer rate for transferring data from a first network device to a second network device over a first network exceeds a downstream transfer rate, the downstream transfer rate corresponding to a transfer rate between the second network device and a third network device over a second network. In response to making such a determination, the instructions further cause the computing device to generate a configuration message that, when received by the first network device, causes the first network device to limit data transfer between the first network device and the second network device to no greater than the downstream transfer rate. The instructions also cause the computing device to transmit the configuration message to the first network device.

In yet another implementation of the present disclosure, a non-transitory computer readable medium is provided. The computer readable medium includes instructions that, when executed by one or more processors of a computing device, cause the computing device to to determine that a negotiated transfer rate for transferring data from a first network device to a second network device over a first network exceeds a downstream transfer rate, the downstream transfer rate corresponding to a transfer rate between the second network device and a third network device over a second network. In response to making such a determination, the instructions further cause the computing device to generate a configuration message that, when received by the first network device, causes the first network device to limit data transfer between the first network device and the second network device to no greater than the downstream transfer rate. The instructions also cause the computing device to transmit the configuration message to the first network device.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
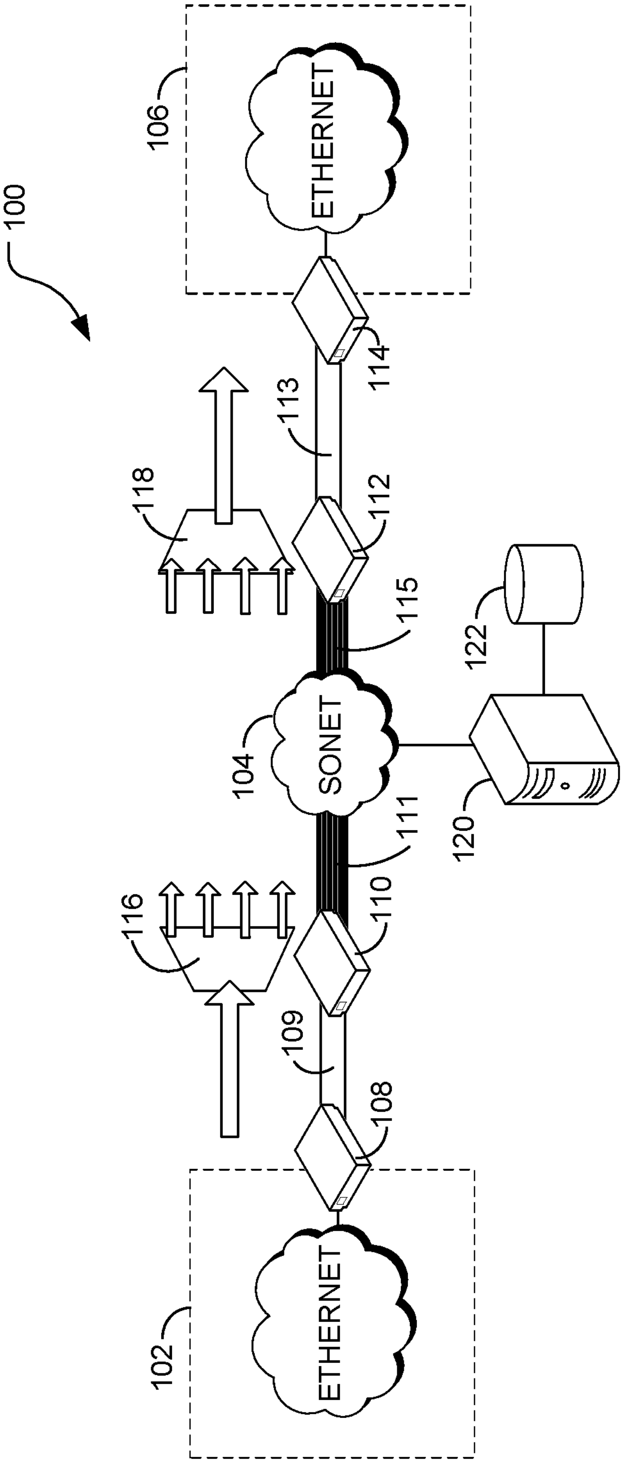
FIG. 1 is a schematic illustration of an example network environment for transferring data between networks.

Conventional autonegotiation enables data transmission between devices at the highest common rate supported by each device. Autonegotiation generally includes an exchange of messages in which each device declares the different transmission parameters under which it may operate. Such parameters may include, without limitation, transmission rates and whether full or half duplex transmission is supported. Autonegotiation resides in the physical layer and, as a result, the transmission parameters exchanged by a device are dictated by the physical capabilities of the device and often by standards associated with the network protocol for which the device is designed. For example, Ethernet devices generally support transmission at rates corresponding to powers of ten megabits (Mbit) per second (e.g., 1 Mbit/s, 10 Mbit/s, 100 Mbit/s, 1000 Mbit/s (i.e., 1 gigabit (Gbit) per second), etc.), each of which may be supported in either full or half duplex mode. After exchanging transmission parameters, each device within the exchange identifies a common set of transmission parameters for use in subsequent data transmission. In certain implementations, the process of identifying a common set of transmission parameters prioritizes high transfer rates over full duplex transmission and full duplex transmission over half duplex transmission. Accordingly, devices generally select the highest available common transfer rate and full duplex communication, if available.

When devices operating using the same protocol undergo autonegotiation, the list of exchanged data transmission parameters are similar and often include one or more matches. For example, the transmission parameters exchanged between two Ethernet-enabled devices will often include at least some common transmission rates even though one of the devices may also support faster rates. However, problems may arise when one of the network devices is used to exchange data between networks having different protocols and different transmission parameters. SONET networks, for example, commonly operate using Synchronous Transport Signal 1 (STS-1) or Synchronous Transport Signal 3 (STS-3c) framing carried over links that support transmission rates at approximately 50 Mbit/s, and approximately 150 Mbit/s, respectively. Different transmission rates are generally attained by the virtual concatenation of multiple STS-1, STS-3c, STS-12c, STS-24c, and STS-48c channels, among others, but are generally limited to multiples of the base STS-1, STS-3c, STS-12c, etc. transmission rates. Nevertheless, for a wide range of transmission rates, services provisioned over a SONET network may be provided with greater granularity than is supported by Ethernet and transmission rate mismatches between the capacity of the SONET network and any Ethernet networks connected thereto.

For example, the nearest Ethernet transfer rates for providing data to a SONET link provisioned for a 600 Mbit/s service are 100 Mbit/s and 1 Gbit/s. If a 100 Mbit/s transfer rate is used to transfer data between an endpoint device of the Ethernet network and a corresponding endpoint device of the SONET network, 500 Mbit/s of bandwidth goes unused. On the other hand, the 1 Gbit/s transfer rate exceeds the provisioned service rate by 400 Mbit/s. In certain conventional applications, the excess data is simply ignored (e.g., by sending the corresponding excess signal energy to ground), which can render the data stream largely useless. In other conventional applications, an endpoint device of the Ethernet network may be manually configured to include a buffer that accepts 1 Gbit every two seconds such that 600 Mbit may be transmitted during the first second and 400 Gbit may be transmitted during the subsequent second. Although the data is fully transmitted, the result is an average transmission rate (i.e., 500 Mbit/s) from the Ethernet network to the SONET network that is below the provisioned rate of the 600 Mbit/s service.

Considering the foregoing challenges, systems and methods disclosed herein are directed to implementing an improved autonegotiation process for use in facilitating data transmission between disparate networks. In one example, the process includes determining a first transfer rate between a first endpoint device of a first network and a second endpoint device of a second network. The first transfer rate may correspond with a maximum transfer rate between the endpoint devices. If the transfer rate exceeds a second transfer rate, which may correspond to a maximum transfer rate over the second network, a configuration message is sent to the first endpoint device that limits data transfer from the first endpoint device to the second endpoint device to the second rate.

With reference to the previous example, the first endpoint device may be a router, switch or similar device coupled to the Ethernet network, and the second endpoint device may be an Ethernet transceiver adapted to convert Ethernet traffic to SONET traffic. During the autonegotiation process, the transceiver and the router exchange transmission parameters and determine that transmission between the two devices may occur at up to 1 Gbit/s (i.e., the first transfer rate) based on the corresponding physical layer of each endpoint device. The second transfer rate, which corresponds to a transfer rate over the second network, may then be identified as 600 Mbit/s. The second transfer rate may correspond to several data rates including, without limitation, a maximum data rate provisioned by a customer associated with the first network, a physical limitation of the SONET network link, and a maximum transfer rate of a destination endpoint device. Upon determining that the second transfer rate is below the first transfer rate, a configuration message is sent to the first endpoint device that causes the first endpoint device to automatically limit traffic sent to the second endpoint device to the second transfer rate.

As previously noted, the second transfer rate may correspond to various transfer rates related to data transmission over the second network. Accordingly, systems in accordance with this disclosure may be adapted to determine the second transfer rate in various ways. For example, in certain implementations, the second data rate may be preprogrammed or otherwise stored in memory of the second endpoint device. In other implementations, a computing device in communication with the second endpoint device may receive notification of the negotiation process between the first and second endpoint devices and may perform a lookup or other function on a table including a list of services or data transfer rates. The computing device may be further adapted to generate and send the configuration message to the first endpoint device. In still other implementations, the second transfer rate may correspond to a negotiated transfer rate between another endpoint device of the second network and another external device. The second transfer rate may also dynamically change to reflect conditions of the second network and corresponding configuration messages may be transmitted to the first endpoint device when such changed conditions occur. For example, the second transfer rate may be updated when channel capacity of the second network is impaired or otherwise encounters an error and a corresponding configuration message may be automatically generated and transmitted to the first endpoint device when such an error occurs.

Although primarily described in the context of communication between an Ethernet network and a SONET network, the systems and methods described herein may be applied to any network devices that may connect networks or subnetworks with different transmission parameters. Accordingly, to the extent examples disclosed herein refer to Ethernet or SONET endpoint devices, such distinctions are used simply to provide context and clarity to the examples. Moreover, to the extent the disclosure refers to communication between endpoint devices, such endpoint devices are not necessarily separate devices but, rather, may be separate components or modules integrated into a single device. For example, a router or switch may be integrated into a single device with a transceiver that facilitates communication between different networks.

FIG. 1 is a schematic illustration of an example network environment 100 for transferring data between networks. The implementation of FIG. 1 illustrates transmission of data from a first Ethernet network 102 to a second Ethernet network 106 via a SONET network 104. Transmission of data between the networks is facilitated by endpoint devices adapted to process and route incoming data. For example, the first Ethernet network 102 includes a first Ethernet endpoint device 108 communicatively coupled to a first SONET endpoint device 110 by a first link 109 to facilitate data transmission between the first Ethernet network 102 and the SONET network 104. The first SONET endpoint device 110 is in turn communicatively coupled to the SONET network 104 by one or more first SONET channels 111. Similarly, a second SONET endpoint device 112 is communicatively coupled to a second Ethernet endpoint device 114 by a second link 113 to facilitate data transmission between the SONET network 104 and the second Ethernet network 106. The second SONET endpoint device 112 is also coupled to the SONET network 104 by one or more second SONET channels 115. Accordingly, data originating from either the first or second Ethernet network 102, 106 and destined for the second and first Ethernet network 106, 102, respectively, passes through each of the endpoint devices.

The interconnected components of the network environment 100 may undergo an autonegotiation process in which transfer rates between devices are established. For example, upon connection and startup of the first Ethernet endpoint device 108 and the first SONET endpoint device 110, the endpoint devices 108, 110 may exchange transmission parameters and determine a set of common transmission parameters supported by each endpoint device 108, 110. For purposes of this disclosure, the transmission parameters include a transmission speed, but may further include other parameters including, without limitation, whether the devices support full or half duplex communication and specific flow control parameters to be used. Generally, the autonegotiation process occurs over the physical layer and results in selection of the highest possible rate supported by the connected devices.

In certain instances, the endpoint devices may not support a common transfer rate. For example, Ethernet devices generally support transfer rates according to a “power of ten” model (e.g., 10 Mbit/s, 100 Mbit/s, 1 Gbit/s, etc.), while the majority of SONET networks operate using links that can be virtually concatenated to provide services at data transfer rates in multiples of approximately 50, 150, or 600 Mbit/s. As a result, a wide range of possible SONET transfer rates exist between the standard Ethernet transfer rates. So, for example, a service provider may provision a 600 Mbit/s SONET service. Regardless of whether the customer’s Ethernet equipment can provide data at either 100 Mbit/s or 1 Gbit/s, autonegotiating either rate is problematic. Although the SONET service is capable of handling 100 Mbit/s, using such a rate results in data transfer at only a fraction of the provisioned rate, which makes inefficient use of the additional dedicated SONET bandwidth paid for by the customer. On the other hand, the provisioned SONET service is generally unable to handle a full 1 Gbit/s. In such instances, many devices are configured to simply drop the excess data, resulting in an incomplete and possibly useless data stream. Alternatively, one of the endpoint devices may be manually configured to buffer incoming data from the Ethernet network and to send the data over the SONET network over several seconds such that the maximum provisioned rate is not exceeded. For example, in the current example, one of the endpoint devices may be configured to accept 1 Gbit/s but to transmit 600 Mbit of the received data during a first second and 400 Mbit over a subsequent second. This approach still results in an overall reduced data transfer rate (500 Mbit/s) as compared to the provisioned rate (600 Mbit/s).

Referring more specifically to the network environment 100, an initial autonegotiation process between the first Ethernet endpoint device 108 and the first SONET network device 110 may result in a data transfer rate between the endpoint devices 108, 110 that exceeds a provisioned rate over the SONET network 104. For example, as described in the previously discussed example, a transfer rate of 1 Gbit/s may be negotiated between the first Ethernet endpoint device 108 and the first SONET endpoint device 110 while a service provided over the SONET network 104 may only support a transfer rate of 600 Mbit/s. As previously noted, conventional SONET networks generally comprise a plurality of channels, each of which are capable of transmitting at approximately 50, 150, or 600 Mbit/s. Accordingly, in the example of FIG. 1, the one or more first channels 111 may correspond to four STS-3c payloads, each of which is capable of transmitting data at approximately 150 Mbit/s to achieve the provisioned 600 Mbit/s rate. To provide the full provisioned rate, virtual concatenators may be used that act as inverse multiplexers for distributing a single stream of data over multiple first channels. For example, data transmitted over the first link 109 may be passed through a virtual concatenator 116 that splits the data between the one or more first channels 111. Similarly, a corresponding virtual concatenator 118 may be used to convert data to or from the one or more second channels 115 for transmission over the second link 113 between the second SONET endpoint device 112 and the second Ethernet endpoint device 114.

Systems and methods in accordance with this disclosure address the foregoing issues by automatically determining a mismatch between the transfer rate between endpoint devices and a transfer rate, also referred to herein as a “provisioned rate”, over a network coupled to one of the endpoint devices. If such a discrepancy is present, a configuration message is automatically generated and sent to the higher throughput endpoint device that causes the device to limit its transfer rate to the provisioned rate. In contrast to conventional autonegotiation, which generally occurs at the physical layer, the exchange of the configuration message(s) may occur at a higher order layer, such as the data link layer.

Identification of a transfer rate mismatch generally requires a determination of the provisioned transfer rate. The process of doing so may vary depending on the specific implementation of the present disclosure. In one implementation, the provisioned rate may be stored in the configuration data of an endpoint device. For example, the first SONET endpoint device 110 may include a table or similar data structure that includes provisioned data transfer rates for each link between the first SONET endpoint device 110 and other endpoint devices, such as the first Ethernet endpoint device 108.

In another implementation, the transfer rate over the SONET network 104 may be dictated, at least in part, by a negotiated rate between other devices. For example, if data is being transferred from the first Ethernet network 102 to the second Ethernet network 106, a bottleneck may occur at the second link 113 if the rate negotiated by the endpoint devices 112, 114 is less than the provisioned rate for transferring data over the SONET network 104 or the negotiated rate over the first link 109. Accordingly, part of the negotiation process may include retrieving the transfer rate for the second link 113 from the second SONET endpoint device 112 or a computing device with access to the configuration data of the second SONET endpoint device 112.

In yet another implementation, a computing device 120 may be communicatively coupled to the SONET network 104 or otherwise in communication with the first SONET endpoint device 110. The computing device 120 may also be communicatively coupled to a data source 122 including data corresponding to services provisioned over the SONET network 104. For example, the data source 122 may include information regarding, among other things, the provisioned transfer rates for particular services associated with particular customers. Accordingly, during the negotiation process, the computing device 120 may receive a negotiated rate for data transfer over the first link 109 and compare the negotiated rate with the provisioned rate for transmitting data over the SONET network 104. Alternatively, the computing device 120 may provide the provisioned rate information to the first SONET endpoint device 110 which then performs the comparison. For example, in response to provisioning a new service, the computing device 120 may transmit a message to the first SONET endpoint device 110 that automatically updates the configuration of the first SONET endpoint device 110 to include the provisioned rate.

To the extent a discrepancy is identified between the transfer rate over the first link 109 and a downstream rate (such as a provisioned rate or a lower negotiated rate between destination devices), a configuration message is generated and transmitted to the first Ethernet endpoint device 108. The configuration message is adapted to automatically reconfigure the first Ethernet endpoint device 108 to reduce the data transfer rate over the first link 109 to the downstream rate. For example, in the previously discussed example in which the first link 109 is negotiated to have a rate of 1 Gbit/s but a provisioned rate over the SONET network 104 is only 600 Mbit/s, the configuration message would cause the first Ethernet endpoint device 108 to transmit only 600 Mbit/s over the first link 109. In certain implementations, the configuration may be adapted to execute or modify a traffic shaping policy of the first Ethernet endpoint device 108. For example, if the first Ethernet endpoint device 108 is self-limiting, the configuration message may automatically cause the upper bound limit of the data transfer rate from the first Ethernet endpoint device 108 to be reduced to the downstream rate.

The configuration message may be generated and transmitted from various locations within the network environment 100. In one implementation, the first SONET endpoint device 110 may be adapted to generate and transmit the configuration message to the first Ethernet endpoint device 108 over the first link 109. In another implementation, the computing device 120 coupled to the SONET network 104 or a similar computing device may be adapted to generate and transmit the configuration message to the first Ethernet endpoint device 108. In such implementations, the configuration message may first be received by the first SONET endpoint device 110 which then forwards the message to the first Ethernet endpoint device 108 over the first link 109. Alternatively, the computing device 120 may be communicatively coupled to the first Ethernet endpoint device 108 over a separate connection or network such that the computing device 120 may transmit the message to the first Ethernet endpoint device 108 without involvement by the first SONET endpoint device 110.

Although previously described in the context of autonegotiation during the initial connection between endpoint devices, the enhanced autonegotiation process described herein may also be implemented in response to other events. Notably, conventional autonegotiation occurs on the physical layer and, as a result, generally requires a link between devices to be disconnected in order to renegotiate a transfer rate between the devices. In contrast, the exchange of configuration messages within the approach disclosed herein enables dynamic modification of transfer rates between devices without requiring termination of existing links between the devices. Accordingly, if available bandwidth is reduced, for example by one or more channels of the SONET network being impaired, or increased, for example by repairing such impaired channels, the system can automatically adjust data rates between endpoint devices without downtime.

Referring to FIG. 1, one of the channels 111, 115 may become impaired or another event may occur resulting in the channel being disabled and reducing the overall bandwidth through the SONET network 104. In implementations where the paths through the network 104 are composed of STS-1 or STS-3c channels, for example, such an error would result in a reduction of approximately 50 or 150 Mbit/s, respectively. In response to identifying such an event, a configuration message may be generated and transmitted to the first Ethernet endpoint device 108 similarly reducing the throughput of the first Ethernet endpoint device 108 by a commensurate amount. When the channel is restored and capacity is increased, a second configuration message may be sent to the first Ethernet endpoint device 108 to increase throughput to the pre-error amount.

Configuration messages may be used to change the throughput of the first Ethernet endpoint device 108 in response to modifications to an existing service provided to a customer. More specifically, the provisioned rate for transmitting data over the SONET network 104 may be increased or decreased in response to customer needs. In response to such changes, corresponding configuration messages may be automatically transmitted to the first Ethernet endpoint device 108 such that the data transfer rate over the first link 109 is similarly altered.

Figure 2:
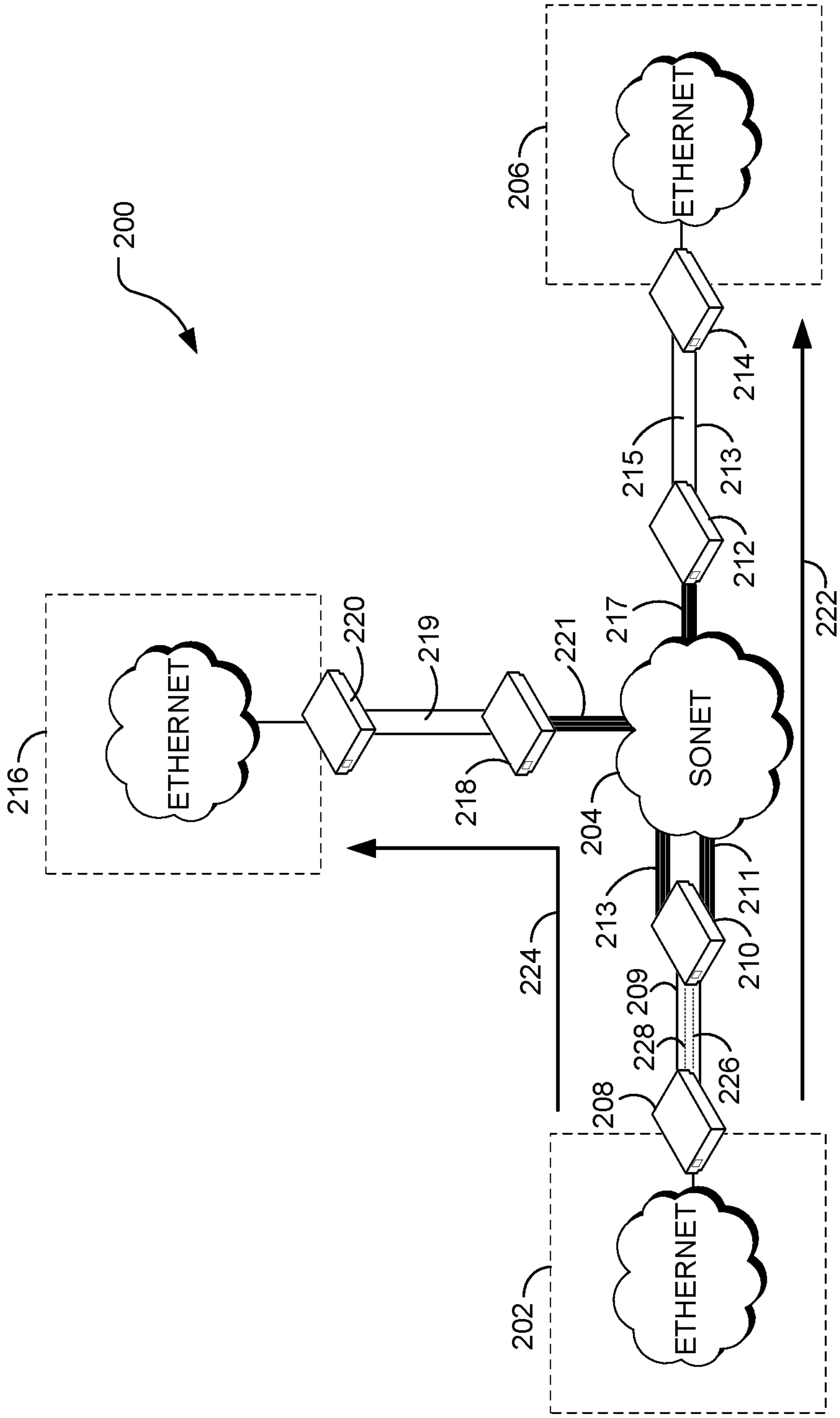
FIG. 2 is a schematic illustration of as second example network environment for transferring data between networks.

FIG. 2 is a schematic illustration of a second example network environment 200 for transferring data between networks. The implementation of FIG. 2 illustrates transmission of data from a first Ethernet network 202 to each of a second Ethernet network 206 and a third Ethernet network 216 via a SONET network 204.

Transmission of data between the networks 202, 206, 216 is facilitated by endpoint devices adapted to process and route incoming data. For example, the first Ethernet network 202 includes a first Ethernet endpoint device 208 communicatively coupled to a first SONET endpoint device 210 by a first link 209 to facilitate data transmission between the first Ethernet network 202 and the SONET network 204. The first SONET endpoint device 210 is in turn communicatively coupled to the SONET network 204 by multiple sets of one or more first SONET channels 211, 213. A second SONET endpoint device 212 is communicatively coupled to a second Ethernet endpoint device 214 by a second link 215 to facilitate data transmission between the SONET network 204 and the second Ethernet network 206. The second SONET endpoint device 212 is also coupled to the SONET network 204 by one or more second SONET channels 217. Similarly, a third SONET endpoint device 218 is communicatively coupled to a third Ethernet endpoint device 220 by a third link 219 to facilitate data transmission between the SONET network 204 and the third Ethernet network 216. The third SONET endpoint device 218 is also coupled to the SONET network 204 by one or more third SONET channels 221.

During operation, data originating from the first Ethernet network 202 may be split between the second and third Ethernet networks 206, 216. For example, the first link 209 may be divided into two separate virtual channels 226, 228 (or similar sub-interfaces) for transmitting data to each of the second Ethernet network 206 and the third Ethernet network 216 along corresponding paths 222, 224, respectively. As illustrated in FIG. 2, the first SONET endpoint device 210 is adapted to redirect data received from the first Endpoint device 210 over the first virtual channel 226 and a first set of the SONET channels 211 to the second Ethernet network 206. Similarly, the first SONET endpoint device 210 is adapted to redirect data received from the first Endpoint device 210 over the second virtual channel 228 and a second set of the SONET channels 213 to the second Ethernet network 206.

Upon connection and activation, the first Ethernet endpoint device 208 and the first SONET endpoint device 210 may negotiate a first transfer rate corresponding to a maximum rate over which data may be transferred over the first link 209. The bandwidth of the first link 209 is then allocated between the first virtual channel 226 and the second virtual channel 228 as necessary. However, each of the first path 222 and the second path 224 may include bottlenecks that are less than the possible maximum bandwidth that may be allocated to the first virtual channel 226 and the second virtual channel 228, respectively. For example, the first link 209 may support up to 1 Gbit/s that may be distributed between the first virtual channel 226 and the second virtual channel 228, up to and including using the full 1 Gbit/s for either of the first virtual channel 226 and the second virtual channel 228. If the first path 222 includes a link over the SONET network 204 that is provisioned for less than 1 Gbit/s, data may be transferred over the first virtual channel 226 at a rate exceeding that supported by the first path 222. As another example, the third SONET endpoint device 218 and the third Ethernet network device 220 may negotiate a transfer rate for the third link 219 that is less than 1 Gbit/s and, as a result, data may be transferred over the second virtual channel 228 at a rate that exceeds the maximum bandwidth of the third link 219.

Systems and methods according to this disclosure address the foregoing issue by facilitating dynamic modification of the maximum transfer rate for individual virtual channels of the first data link 209. To do so, a transfer rate for a virtual channel is compared to a corresponding downstream transfer rate. To the extent the virtual channel transfer rate exceeds the downstream transfer rate, a configuration message is generated and transmitted to an endpoint device. The configuration message automatically reconfigures the endpoint device to limit the transfer rate over the virtual channel to the downstream transfer rate. When received, the configuration message automatically reconfigures the endpoint device to limit the transfer rate over the virtual channel to the downstream rate. This process may be repeated for each virtual channel of the endpoint device, thereby limiting data transferred over each virtual channel to the maximum rate that may be transmitted along a respective path.

Referring to FIG. 2, for example, following negotiation of a total transfer rate for the first link 209 between the first Ethernet endpoint device 208 and the first SONET endpoint device 210, downstream transfer rates for each of the first path 222 and the second path 224 may be determined. As previously discussed in the context of FIG. 1, determining a downstream transfer rate may include, without limitation, one or more of retrieving internal configuration data from the first SONET endpoint device 210, receiving a message from a downstream device (e.g., the second SONET endpoint device 210 for the first path 222 and the third SONET endpoint device 220 for the second path 224) including a downstream transfer rate, and receiving a message including a downstream transfer rate from a computing device (not shown) communicatively coupled to the SONET network 204 and a data source including information regarding services provisioned over the SONET network 204.

Upon receiving downstream transfer rates corresponding to the first path 222 and the second path 224, each downstream transfer rate is compared to the negotiated transfer rate for transmitting data over the link 209. If the negotiated transfer rate exceeds one of the downstream transfer rates, a configuration message is generated and sent to the first Ethernet endpoint device 208 that then causes the first Ethernet endpoint device 208 to restrict data transfer over the corresponding channel to the downstream transfer rate. In one implementation, one configuration message may be sent that causes all necessary reconfiguration of the first Ethernet endpoint device 208. Alternatively, multiple configuration messages may be sent, each message corresponding to a subset of the paths for which limiting of a corresponding virtual channel is required. Although, a separate data transfer rate is identified and implemented for each virtual channel of the first link 209, in alternative embodiments some or all virtual channels may be limited to a particular downstream transfer rate. For example, all virtual channels may be limited to the lowest downstream transfer rate.

Similar to the example of FIG. 1, analysis of transfer rates and configuration of the first Ethernet endpoint device 208 and, more specifically, the sub-interfaces of the first Ethernet endpoint device 208 may occur at various times and in response to various events. For example, in certain implementations, the process of analyzing transfer rates and reconfiguring the first Ethernet endpoint device 208 may occur in response to connecting and activating the first Ethernet endpoint device 208 and the first SONET endpoint device 210. In another implementation, the process may occur in response to a change in one or more downstream networks that result in a change in one or more downstream transfer rates. Such changes may include, without limitation, changes in the SONET network 204 (such as, without limitation, a channel of the SONET network 204 becoming impaired or being reactivated following repair) or changes to any downstream endpoint devices. In yet another implementation, the process may occur in response to activating a new data service or modifying an existing service provisioned over the SONET network 204. Similarly, the process may occur in response to activation, deactivation, or other modification of a virtual channel of the first link 209.

Figure 3:
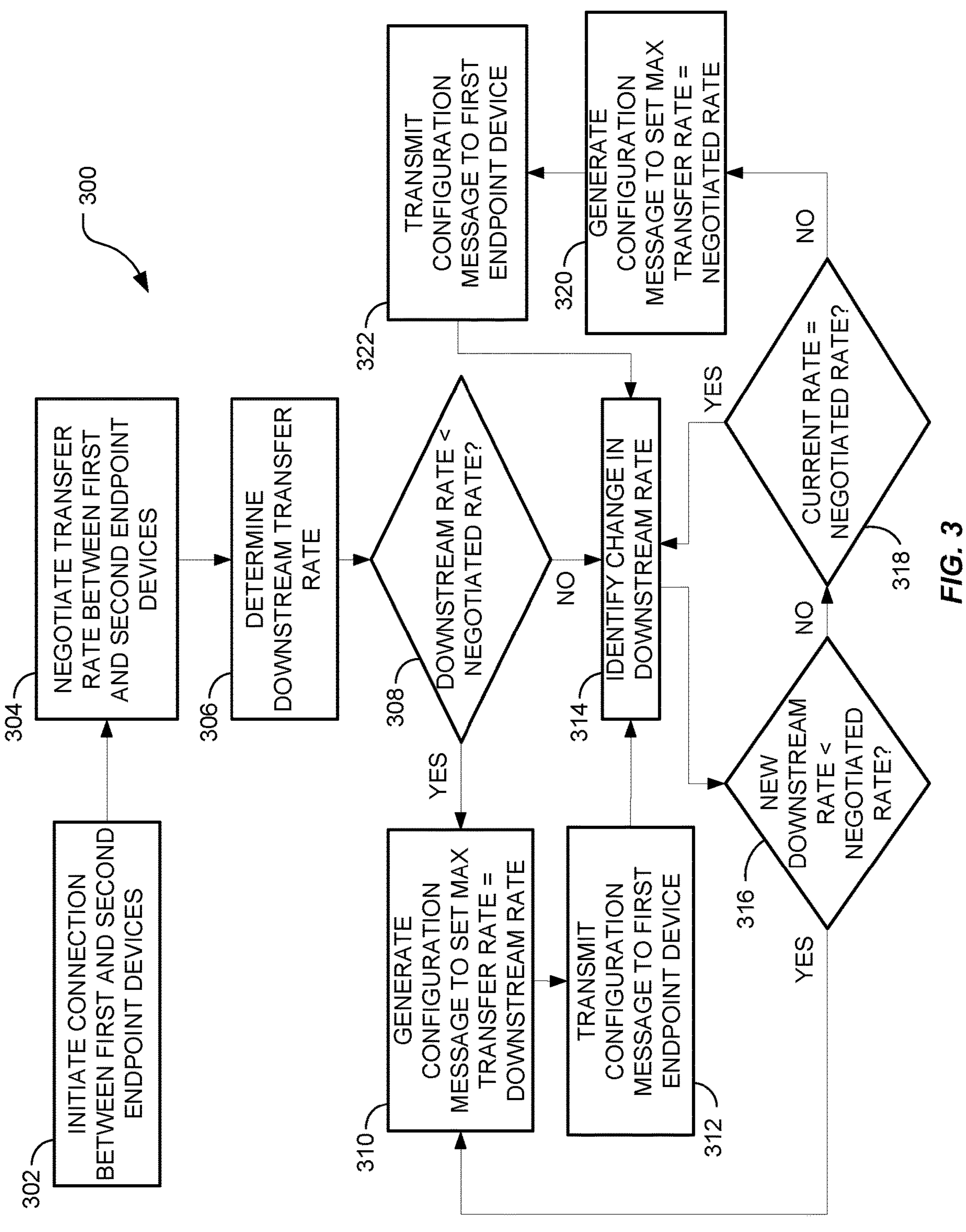
FIG. 3 is a flow chart illustrating an example method for negotiating data transfer rates between network devices.

FIG. 3 is an example of an enhanced autonegotiation method 300 in accordance with this disclosure. With reference to the network environment 100 of FIG. 1, the method includes initiating a connection between a first endpoint device and a second endpoint device (operation 302), each endpoint device corresponding to an endpoint of a network or subnetwork between which data is to be exchanged. In the network environment 100, for example, the first endpoint device may correspond to the first Ethernet endpoint device 108 and the second endpoint device may correspond to the first SONET endpoint device 110.

Once connected, a negotiation process may occur in which a transfer rate between the first and second endpoint devices is determined (operation 304). In certain implementations, the negotiation process includes the endpoint devices 108, 110 exchanging a list of supported transmission parameters. Such transmission parameters generally include transmission speed, but may further include, among other things, whether the device supports half or full duplex and specific flow control parameters implemented by the device. Based on the exchanged transmission parameters, a negotiated transfer rate is selected, which may generally be the highest mutually supported transfer rate between the two devices, irrespective of any downstream bottlenecks. In FIG. 1, for example, the negotiated transfer rate may be the maximum transfer rate between the first Ethernet endpoint device 108 and the first SONET endpoint device 110 over the first link 109.

After negotiating the rate between the first and second endpoint, a downstream transfer rate is determined (operation 306). In certain implementations, the downstream transfer rate corresponds to the lowest transfer rate (i.e., a bottleneck) of a path along which data is to be transmitted. In certain implementations, the downstream transfer rate may correspond to a transfer rate of a service provisioned over the network associated with the second endpoint device. In FIG. 1, for example, the downstream transfer rate may correspond to a provisioned transfer rate for a data transfer service over the SONET network 104. The second transfer rate may also be a modified version of the provisioned rate, such as in the event of a failure of one or more data paths of the SONET network 104 or a reconstitution of previously failed data paths. In another implementation, the second transfer rate may correspond to a transfer rate between destination endpoint devices. For example, a second SONET endpoint device 112 may negotiate a transfer rate with a second Ethernet endpoint device 114 of a second Ethernet network 106 configured to receive traffic from the first Ethernet network 102.

The process of determining the downstream transfer rate may be facilitated, in certain implementations, by a computing device communicatively coupled to the second network. For example, the network environment 100 includes a computing device 120 communicatively coupled to the SONET network 104. The computing device 120 may be in communication with a data source 122 that stores information, such as transfer rates of provisioned services, which may be used by the computing device 120 in determining the downstream transfer rate. For example, in certain implementations, the computing device 120 receives a notification from the first SONET endpoint device 110 following completion of negotiation with the first Ethernet endpoint device 108, the message including, among other things, the negotiated rate. The message may further include an address or other identifier from which a particular provisioned service may be identified. The computing device 120 may then perform a lookup in the data source 122 using the identifier to determine the transfer rate associated with the provisioned service.

Once each of the negotiated and downstream rates is identified, the two rates are compared to determine whether the downstream rate is lower than the negotiated rate (operation 308). If so, a configuration message is generated (operation 310) and transmitted to the first endpoint device (operation 312). The configuration message may be generated by, among other devices, one or more of the first SONET endpoint device 110 and the computing device 120. The configuration message generally includes instructions and related data that cause the first endpoint device to update internal configuration data, limiting data transfer from the first endpoint device to no more than the downstream transfer rate. For example, in certain implementations, the configuration message includes a script or similar instructions that, when executed by the first endpoint device cause the first endpoint device to automatically activate or modify buffers, traffic/rate shaping protocols, or other transfer rate control mechanisms of the first endpoint device.

After reconfiguration of the first endpoint device (or if no such reconfiguration was required), an operational loop may be executed in which the system is monitored for changes in the downstream rate. When such a change is identified (operation 314), an update routine may be executed. A change in the downstream rate may occur in response to various events including, without limitation, installation of new downstream equipment, modification of existing downstream equipment, provisioning of a new service, modification of an existing service, failure of downstream equipment or data transmission lines, and repair or reactivation of failed downstream equipment or data transmission lines. Such events may raise an alert or otherwise trigger an exchange of messages across a network or initiation of an autonegotiation process between devices of the network. For example, one or more devices coupled to a failed component may be configured to generate a message that is then transmitted to the computing device 120 for subsequent handling.

When the downstream rate changes, the new downstream rate may be compared to the negotiated rate (operation 316) and, if the new downstream rate is below the negotiated rate, the process of generating and transmitting a configuration message (i.e., operations 310, 312) is executed to set the transfer rate of the first endpoint device to the new downstream rate. If, on the other hand, the new downstream rate is not less than the negotiated rate, a supplemental check to see if the current transfer rate is equal to the negotiated rate may be performed (operation 318). If the current transfer rate is already the negotiated rate (which generally corresponds to the maximum rate at which data can be transferred over the first link 109), the system may return to waiting until a change in the downstream rate occurs. Otherwise, a configuration message for changing the transfer rate to the negotiated rate may be generated and transmitted to the first endpoint device (operations 320 and 322). The system may then wait for subsequent changes to the downstream transfer rate.

Although the method 300 illustrated in FIG. 3 is described primarily in the context of the network environment 100 of FIG. 1, such a method may be modified for application in an environment in which data is to be transmitted over multiple paths, such as the network environment 200 of FIG. 2. For example, operations 306-322, which are directed to the general process of identifying and remedying discrepancies between downstream transfer rates and a negotiated rate, may be conducted for each service path (such as paths 222 and 224) extending from the second endpoint device 210.

Figure 4:
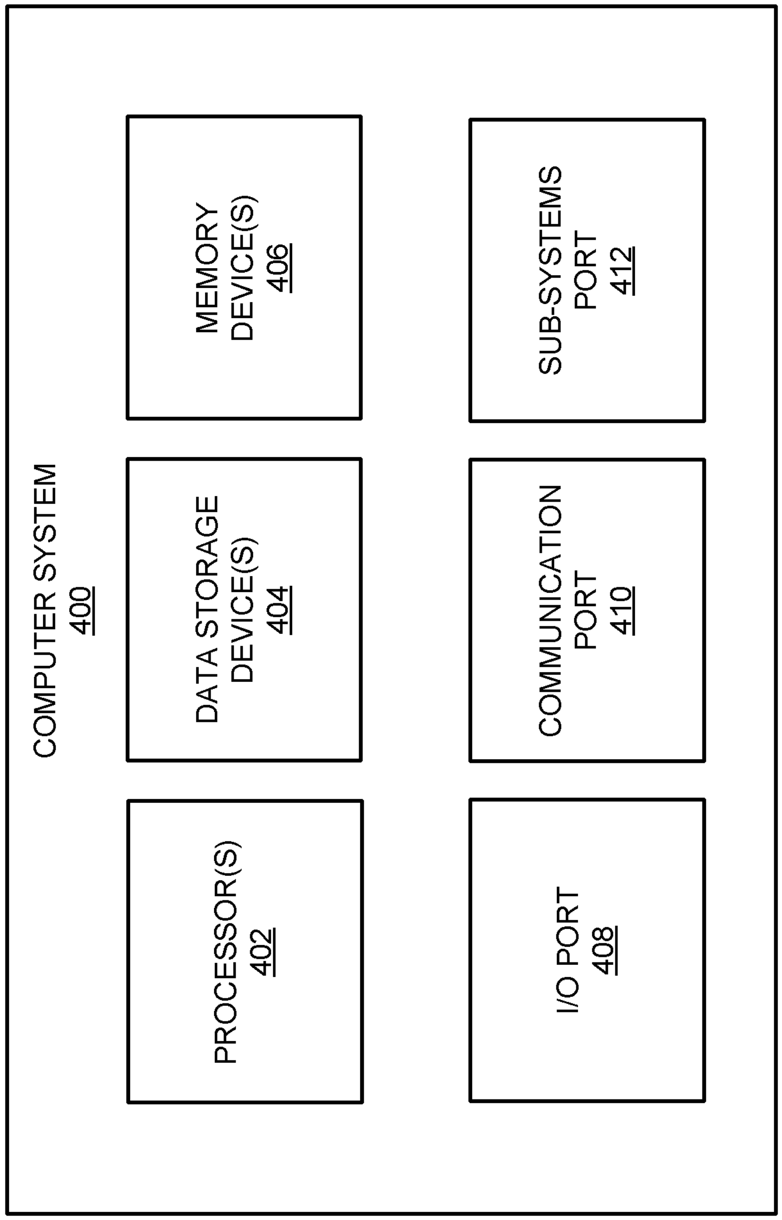
FIG. 4 is an example computing system that may implement various systems and methods of the presently disclosed technology.

Referring to FIG. 4, a schematic illustration of an example computing system 400 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 400 may be a computing system capable of executing a computer program product to execute a computer process. Data and program files may be input to computer system 400, which reads the files and executes the programs therein. Some of the elements of the computer system 400 are shown in FIG. 4, including one or more hardware processors 402, one or more data storage devices 404, one or more memory devices 408, and/or one or more ports 408-412. Additionally, other elements that will be recognized by those skilled in the art may be included in the computing system 400 but are not explicitly depicted in FIG. 4 or discussed further herein. Various elements of the computer system 400 may communicate with one another by way of one or more communication buses, point-to-point communication paths, or other communication means not explicitly depicted in FIG. 4.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The computer system 400 may be a conventional computer, a distributed computer, or any other type of computer, such as one or more external computers made available via a cloud computing architecture. The presently described technology is optionally implemented in software stored on data storage device(s) 404, stored on memory device(s) 406, and/or communicated via one or more of the ports 408-412, thereby transforming the computer system 400 in FIG. 4 to a special purpose machine for implementing the operations described herein. Examples of the computer system 400 include personal computers, terminals, workstations, mobile phones, tablets, laptops, personal computers, multimedia consoles, gaming consoles, set top boxes, and the like.

One or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. Data storage devices 404 may include, without limitation, magnetic disk drives, optical disk drives, solid state drives (SSDs), flash drives, and the like. Data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) port 408, a communication port 410, and a sub-systems port 412, for communicating with other computing, network, or vehicle devices. It will be appreciated that the ports 408-412 may be combined or separate and that more or fewer ports may be included in the computer system 400.

The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. Similarly, the output devices may convert electrical signals received from the computing system 400 via the I/O port 408 into signals that may be sensed as output by a human, such as sound, light, and/or touch. The input device may be an alphanumeric input device, including alphanumeric and other keys for communicating information and/or command selections to the processor 402 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing device 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 400, such as, physical movement of some object (e.g., a mechanical actuator), heating or cooling of a substance, adding a chemical substance, and/or the like.

In one implementation, a communication port 410 is connected to a network by way of which the computer system 400 may receive network data useful in executing the methods and systems set out herein as well as transmitting information and network configuration changes determined thereby. Stated differently, the communication port 410 connects the computer system 400 to one or more communication interface devices configured to transmit and/or receive information between the computing system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 410 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 410 may communicate with an antenna for electromagnetic signal transmission and/or reception.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

We claim:

1. A method of establishing a data transfer rate between network endpoints, the method comprising:

initiating a connection between a first endpoint of a first network and a second endpoint of a second network, wherein the connection between the first endpoint of the first network and the second endpoint of the second network can transfer data at up to a first transfer rate;

determining the first transfer rate is greater than a second transfer rate for transferring data over the second network; and transmitting, in response to determining the first transfer rate is greater than the second transfer rate, a configuration message to a network device corresponding to the first endpoint, wherein the configuration message causes the network device to limit transfer of data over the connection from the first endpoint to the second endpoint to no greater than the second transfer rate, wherein the second network includes two or more third endpoints connected to a respective sub-interface of the second endpoint and enabling a respective transfer rate therebetween, the second transfer rate is the respective transfer rate or a sum of the respective transfer rates between the second endpoint and the two or more third endpoints, and the configuration message limits data transfer over each virtual channels transmitting data to the two or more third endpoints to a lowest transfer rate of the respective transfer rates between the second endpoint and each of the two or more third endpoints.

2. The method of claim 1, wherein the first network is an Ethernet network and the second network is a synchronous optical networking (SONET) network.

3. The method of claim 1, wherein the step of determining the first rate is greater than the second transfer rate occurs in response to identifying a decrease in throughput along a communication path between the second endpoint and a third endpoint of the second network.

4. The method of claim 3, further comprising:

identifying an increase in the throughput along the communication path between the second endpoint and the third endpoint; and transmitting a second configuration message to the network device, wherein the second configuration message causes the network device to limit transfer of data from the first endpoint to the second endpoint to a third transfer rate, the third transfer rate up to and including the first transfer rate.

5. The method of claim 1, wherein the transfer rate between each sub-interface of the second endpoint and a respective third endpoint is limited to the lowest transfer rate between any sub-interface of the second endpoint and its corresponding one of the two or more third endpoints.

6. The method of claim 1, wherein the connection between the first endpoint and the second endpoint includes a plurality of virtual channels, each virtual channel of the plurality of virtual channels corresponding to a path between one of the sub-interfaces of the second endpoint and a respective one of the two or more third endpoints, and the configuration message causes the network device to limit data transfer for each virtual channel of the plurality of virtual channels to a transfer rate between the one of the sub-interfaces and the one of the two or more third endpoints corresponding to a respective virtual channel.

7. The method of claim 1, wherein the second transfer rate is obtained from a concatenator adapted to aggregate a plurality of links of the second network, and the second transfer rate is a combined transfer rate of aggregated links.

8. A system for controlling data transfer rates between network devices, the system comprising:

a computing device comprising a processor and one or more non-transitory tangible computer-readable storage media storing computer-executable instructions that, when executed by the processor, cause the computing device to:

determine that a negotiated transfer rate for transferring data from a first network device to a second network device over a first network exceeds a downstream transfer rate, the downstream transfer rate corresponding to a transfer rate between the second network device and a plurality of third network devices over a second network;

generate a configuration message that, when received by the first network device, causes the first network device to limit data transfer between the first network device and the second network device to no greater than the downstream transfer rate; and transmit the configuration message to the first network device, wherein the downstream transfer rate is a sum of transfer rates between the second network device and the plurality of third network devices, wherein the configuration message limits data transfer over each virtual channels transmitting data to the plurality of third network devices to a lowest transfer rate of the transfer rates between the second network device and each of the plurality of third network devices.

9. The system of claim 8, wherein the downstream transfer rate further corresponds to a transfer rate between the third network device and a fourth network device.

10. The system of claim 8, wherein the data transfer between the first network device and the second network device occurs over a link with a plurality of virtual channels for communicating data between the first network device and the second network device.

11. The system of claim 8, wherein the instructions further cause the computing device to:

identify a change in the downstream transfer rate resulting in a first modified downstream transfer rate different from the downstream transfer rate;

determine the first modified downstream transfer rate is less than the negotiated rate;

generate a second configuration message that, when received by the first network device, causes the first network device to limit data transfer between the first network device and the second network device to no greater than the first modified downstream transfer rate; and transmit the second configuration message to the first network device.

12. The system of claim 11, wherein the instructions further cause the computing device to:

identify a second change in the downstream transfer rate resulting in a second modified downstream transfer rate different than the first modified downstream transfer rate;

determine the second modified downstream transfer rate is greater than the first modified downstream transfer rate;

generate a third configuration message that, when received by the first network device, causes the first network device to increase data transfer between the first network device and the second network device to the lesser of the second modified downstream transfer rate and the negotiated transfer rate; and transmit the third configuration message to the first network device.

13. A non-transitory computer readable medium storing instructions that, when executed by one or more processors of a computing device, cause the computing device to:

determine that a negotiated transfer rate for transferring data from a first network device to a second network device over a first network exceeds a downstream transfer rate, the downstream transfer rate corresponding to a transfer rate between the second network device and two or more third network devices over a second network;

generate a configuration message that, when responsive to being received by the first network device, causes the first network device to limit data transfer between the first network device and the second network device to no greater than the downstream transfer rate; and transmit the configuration message to the first network device, wherein the second network includes the two or more third network devices connected to a respective sub-interface of the second network device and enabling a respective transfer rate therebetween, and the second transfer rate is the respective transfer rate or a sum of the respective transfer rates between the second network device and the two or more third network devices, wherein the configuration message limits data transfer over each virtual channels transmitting data to the plurality of third network devices to a lowest transfer rate of the transfer rates between the second network device and each of the plurality of third network devices.

14. The non-transitory computer readable medium of claim 13, wherein the instructions further cause the computing device to:

identify a change in the downstream transfer rate resulting in a modified downstream transfer rate different than the downstream transfer rate;

generate a configuration message that, when received by the first network device, causes the first network device to change a rate of data transfer between the first network device and the second network device; and transmit the configuration message to the first network device, wherein, if the modified downstream transfer rate is less than the downstream transfer rate, the rate of data transfer is changed to a rate equal to or below the modified downstream transfer rate, and, if the modified downstream transfer rate is greater than the downstream transfer rate, the rate of data transfer is changed to a rate that is the lesser of the modified downstream transfer rate and the negotiated transfer rate.

* * * * *